(12) United States Patent
Wagner et al.

(10) Patent No.: US 11,885,285 B2
(45) Date of Patent: Jan. 30, 2024

(54) FUEL VAPOR SWITCH AND VENTILATION VALVE FOR AN INTERNAL COMBUSTION ENGINE

(71) Applicant: PIERBURG GMBH, Neuss (DE)

(72) Inventors: Juri Wagner, Titz (DE); Christoph Mondorf, Neuss (DE)

(73) Assignee: PIERBURG GMBH, Neuss (DE)

( * ) Notice: Subject to any disclaimer, the term of this patent is extended or adjusted under 35 U.S.C. 154(b) by 0 days.

(21) Appl. No.: 17/923,605

(22) PCT Filed: May 8, 2020

(86) PCT No.: PCT/EP2020/062932
§ 371 (c)(1),
(2) Date: Nov. 7, 2022

(87) PCT Pub. No.: WO2021/223889
PCT Pub. Date: Nov. 11, 2021

(65) Prior Publication Data
US 2023/0193858 A1  Jun. 22, 2023

(51) Int. Cl.
*F02M 25/00* (2006.01)
*F02M 25/08* (2006.01)
*F16K 1/44* (2006.01)
*F16K 1/52* (2006.01)
*F16K 17/196* (2006.01)
*F16K 31/06* (2006.01)

(52) U.S. Cl.
CPC ........... *F02M 25/0836* (2013.01); *F16K 1/44* (2013.01); *F16K 1/523* (2013.01); *F16K 17/196* (2013.01); *F16K 31/06* (2013.01)

(58) Field of Classification Search
CPC ....... F02M 25/0836; F16K 1/44; F16K 1/523; F16K 17/196; F16K 31/06
See application file for complete search history.

(56) References Cited

U.S. PATENT DOCUMENTS

| 3,414,232 A | 12/1968 | Hellman |
| 6,651,953 B2 * | 11/2003 | Weldon ................... F16K 24/04 |
| | | 251/129.21 |
| 2002/0088958 A1 * | 7/2002 | Weldon .............. F02M 25/0836 |
| | | 251/129.21 |

(Continued)

FOREIGN PATENT DOCUMENTS

DE    10 2010 044 336 A1    3/2021

*Primary Examiner* — Phutthiwat Wongwian
*Assistant Examiner* — Sherman D Manley
(74) *Attorney, Agent, or Firm* — Norman B. Thot

(57) ABSTRACT

A fuel vapor switching and venting valve for an internal combustion engine. The fuel vapor switching and venting valve includes an electromagnet with an armature, a first connection, a second connection, a first valve seat which is arranged between the first connection and the second connection, a spring, a flow limiting element, a second valve seat which is arranged on the flow limiting element, and a valve body coupled to the armature of the electromagnet. The valve body has a first contact surface with which the valve body can be lowered onto and lifted off of the first valve seat, and a second contact surface with which the valve body can be moved against the second valve seat. The second valve seat is axially displaceable. The spring loads the second valve seat in a direction of the valve body.

14 Claims, 2 Drawing Sheets

(56) References Cited

U.S. PATENT DOCUMENTS

| | | | |
|---|---|---|---|
| 2012/0055943 A1* | 3/2012 | Muller-Riederer | F16K 24/04 |
| | | | 220/745 |
| 2014/0034859 A1 | 2/2014 | Vorbach | |
| 2016/0298778 A1* | 10/2016 | Young | F02M 25/0836 |
| 2018/0119650 A1* | 5/2018 | Brock | F16K 31/404 |
| 2022/0082057 A1* | 3/2022 | Petri | F02M 25/0836 |

* cited by examiner

FUEL VAPOR SWITCH AND VENTILATION VALVE FOR AN INTERNAL COMBUSTION ENGINE

CROSS REFERENCE TO PRIOR APPLICATIONS

This application is a U.S. National Phase application under 35 U.S.C. § 371 of International Application No. PCT/EP2020/062932, filed on May 8, 2020. The International Application was published in German on Nov. 11, 2021 as WO 2021/223889 A1 under PCT Article 21(2).

FIELD

The present invention relates to a fuel vapor switching and venting valve for an internal combustion engine, comprising an electromagnet, a first connection and a second connection, a valve body coupled to an armature of the electromagnet and comprising a first contact surface with which the valve body can be lowered onto and lifted from a first valve seat which is arranged between the first connection and the second connection, and a second contact surface with which the valve body can be moved against a second valve seat which can be displaced axially and which is loaded in the direction of the valve body via a spring.

BACKGROUND

Fuel vapor switching and venting valves serve as shut-off and relief valves and are arranged fluidically between the fuel tank of a vehicle and an activated carbon filter, which serves to absorb fuel vapors, via which pressure fluctuations in the fuel tank are to be compensated. In the event of overpressure or underpressure in the tank, the pressure is reduced by a mechanical bypass function in the case of overpressure by venting to the activated carbon filter, and in the case of underpressure, limiting or compensating the underpressure in the tank by venting.

For safety reasons, it must also be allowed to actively actuate the valve to be able to open the path between the fuel tank and the activated charcoal canister in the event of faults in the tank pressure control, to avoid implosion or explosion.

The fuel vapor switching and venting valve must, for example, be opened immediately before and during the refueling process to ensure that no fuel vapors reach the user due to overpressure when the tank lid is opened and that there is no increased pressure rise in the tank during refueling.

Various valves have previously been described that combine one or more of these functions. For example, DE 10 2010 044 336 A1 describes a valve arrangement in which a switching valve can be actuated via an electromagnet to establish a connection between the tank and the activated carbon filter. The valve body of this valve comprises a second contact surface with which the valve body rests against the control body of a pressure relief valve, which rests against the valve body under spring load and thus closes a central passage in the valve body if there is no excess pressure in the tank. If there is negative pressure in the tank, the valve body can furthermore be moved against a spring element from the seat so that ventilation of the tank takes place. With only one valve, an active connection and disconnection of a fluidic connection between the tank and the activated carbon filter can accordingly be established and, in addition, with defined switching points, a ventilation or deaeration can be established in case an overpressure or an underpressure is too high.

It has, however, been found that it is also necessary to limit the total flow through the valve because the activated carbon filter only provides a limited absorption capacity per unit of time. This can also reduce the size of the activated carbon filter by reducing the maximum flow through the valve.

SUMMARY

An aspect of the present invention is to provide a fuel vapor switching and venting valve with which, in addition to active and passive ventilation of the tank, the total flow to the activated carbon filter can also be reliably limited without the need for an additional valve or increased installation space. An aspect of the present invention is to also provide a flow depending on the applied differential pressure.

In an embodiment, the present invention provides a fuel vapor switching and venting valve for an internal combustion engine. The fuel vapor switching and venting valve includes an electromagnet comprising an armature, a first connection, a second connection, a first valve seat which is arranged between the first connection and the second connection, a spring, a flow limiting element, a second valve seat which is arranged on the flow limiting element, and a valve body coupled to the armature of the electromagnet. The valve body comprises a first contact surface with which the valve body can be lowered onto and lifted off of the first valve seat, and a second contact surface with which the valve body can be moved against the second valve seat. The second valve seat is configured to be axially displaceable. The spring is configured to load the second valve seat in a direction of the valve body.

BRIEF DESCRIPTION OF THE DRAWINGS

The present invention is described in greater detail below on the basis of embodiments and of the drawings in which.

DETAILED DESCRIPTION

Figure 1:
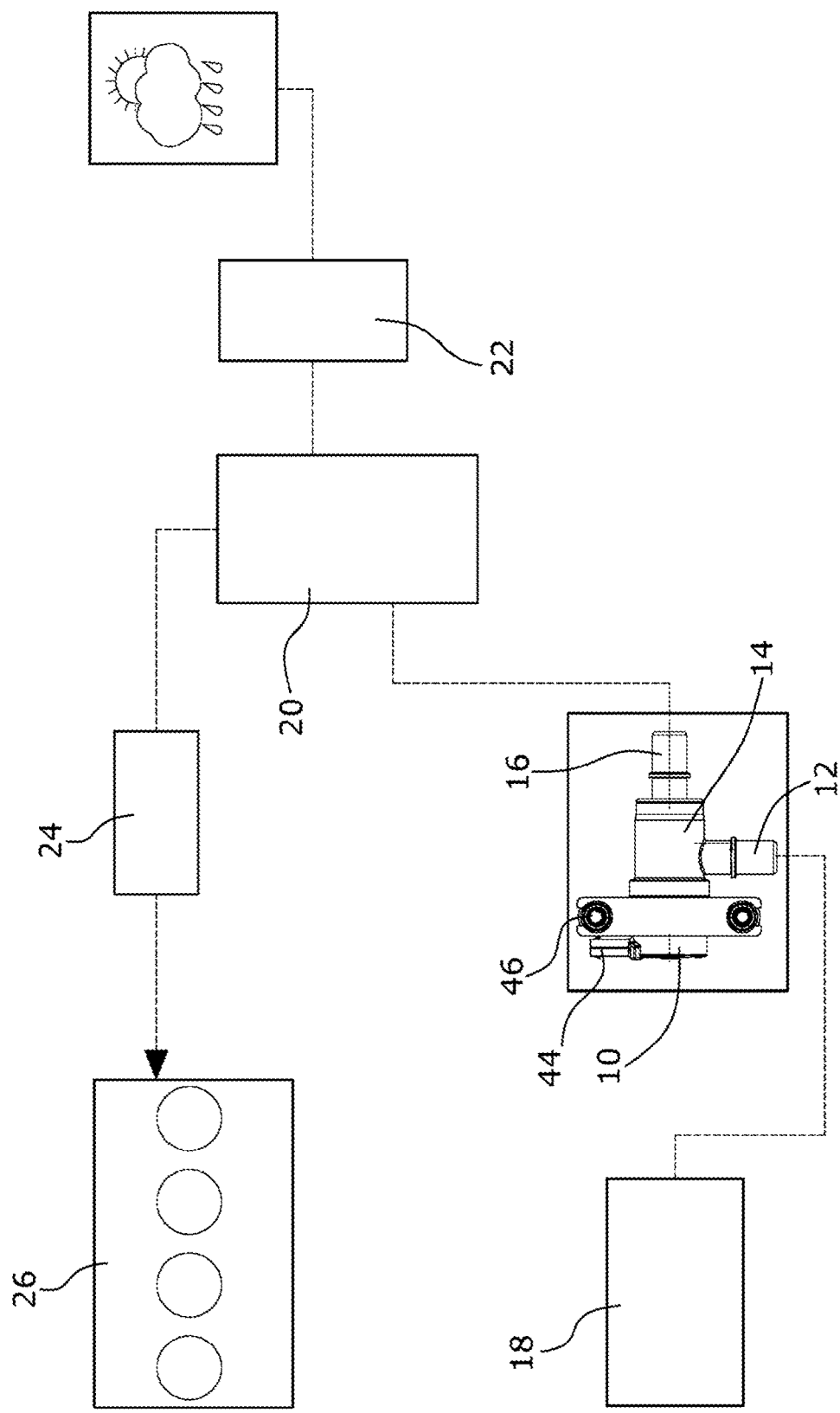
FIG. 1 shows a side view of a fuel vapor switching and venting valve according to the present invention with schematically shown connected components.

A flow limitation is provided without having to use additional components by arranging the second valve seat on a flow limiting element which provides a decreasing flow cross-section when the overpressure at the first connection increases. The control body, with which the passive overpressure function is also provided, is instead also used at the same time to limit the flow so that neither an increased installation space requirement exists nor an increased number of components is used. The overpressure function is performed by applying a pressure from the tank to a surface of the flow limiting element within the second valve seat from which the flow limiting element is accordingly lifted as soon as the force due to the pressure difference exceeds the force of the spring. In addition to the active switching on and off, the valve body also provides the passive negative pressure function since, when negative pressure occurs in the tank, the pressure difference at the valve body has an opening effect, so that when a spring force of a spring element acting on the valve body is exceeded, the resulting force due to the pressure difference lifts the valve body from the first valve seat, so that ventilation of the tank takes place.

The flow limiting element can, for example, comprise a control body which is movable into a nozzle arranged in a flow housing part of the second connection, wherein the spring loads the flow limiting element in a direction facing out of the nozzle. By using the nozzle, the area available for volumetric throughflow is changed as a function of the applied pressure difference, so that a smaller flow area is available at a greater pressure difference, thereby limiting the volumetric throughflow reaching the activated carbon filter even at high pressure differences.

The effect of equalizing the flow to the activated carbon filter can be further enhanced if the flow limiting element comprises a spherically or conically shaped flow around surface arranged opposite an inner surface of the nozzle. An almost constant flow rate can thereby be achieved for different pressure differences.

It is also advantageous if a radially outer ring is configured on the flow limiting element against which the spring abuts, wherein one or more passage openings are configured radially between the ring and the second valve seat and/or the ring and the spherically or conically shaped flow around surface, through which the fuel vapor can flow from one end of the flow limiting element to the other end of the flow limiting element. The ring also serves as a contact surface for the spring so that the flow limiting element is loaded evenly over the circumference in the direction of the electromagnet.

In an embodiment, a stop can, for example, be configured on the flow housing part of the second connection against which the flow limiting element rests in a state minimizing the gap between the spherically or conically shaped flow around surface of the flow limiting element and the inner surface of the nozzle. Fuel vapor can nevertheless flow over the passage openings in this position and then over the gap between the flow limiting element and the nozzle because a gap there remains through which a defined flow rate can pass from the tank to the activated carbon filter, so that an overloading of the activated carbon filter is prevented.

To prevent the flow limiting element from radial displacement, an axial groove is configured on the ring into which the end of the spring that rests on the ring projects so that the flow limiting element is held in its radial position.

A passage opening can, for example, be configured on the valve body which leads radially within the second valve seat. Through this passage opening, the pressure from the tank to the opening of the flow limiting element can act on the inner surface of the flow limiting element in case of an increased internal tank pressure.

It is also advantageous if the valve body is gimballed to a valve rod which is attached to the armature. This form of attachment allows the valve body to be tilted slightly towards the armature, thus providing a circumferential and thus tight support of the valve body on the first valve seat, even in case of assembly inaccuracies or minor deposits.

The valve body can, for example, comprise a carrier element, which is attached to the valve stem and is made of a solid material, and a sealing element, with which the valve body can be lowered onto the two valve seats, and which is made of an elastic material. The carrier element provides sufficient rigidity also in the region of the attachment of the valve body to the valve stem and, on the other hand, the elasticity of the sealing element provides a high degree of tightness when the sealing element is placed on the two valve seats.

In a further development of the present invention, a spring element can, for example, be clamped between the armature and a core of the solenoid. This has the advantage that the spring element is not arranged in the area with direct flow and there is, in this case, a good guidance for the spring in the core so as to reliably avoid a kinking.

In an alternative configuration of the present invention, the spring element is clamped between the solenoid and the valve body and surrounds the valve stem, thereby preventing a kinking. The assembly of the solenoid is simplified in this embodiment.

In an embodiment, the spring element can, for example, rest against a radial extension of a sliding bushing of the solenoid in which the armature is guided and via which the solenoid is sealed from the connections. A helical spring with a large diameter can thereby be used which rests against a non-magnetizable element so that no magnetic forces are transmitted. Due to the arrangement between the extension of the sliding bush and the armature, the spring element is radially restricted in its movement so that lateral slippage is prevented. The sliding bush provides for a low-friction movement of the armature and protects the coil of the electromagnet from penetration by fuel vapors. A seal can, for example, also be arranged between the sliding bush and the outer housing of the solenoid therefor, and, in addition, the sliding bush can, for example, be configured as a pot-shaped closed component at its end facing away from the valve body.

The spring is also advantageously clamped between the ring and a contact surface of the flow housing part of the second connection. This contact surface may also comprise an inner annular projection which defines the nozzle in the interior, whereby the spring is also radially limited in its freedom of movement at its end resting on the flow housing part.

The armature of the solenoid, the valve body, and the flow limiting element, can, for example, be arranged axially one behind the other and be displaceable along a common axis. This reduces the required radial space. All functions of the valve are additionally realized by displacement along this axis.

A fuel vapor switching and venting valve is thus provided with which a connection between an activated carbon filter and a tank can be actively established or closed, wherein at certain operating points, namely an excessively high overpressure relative to atmosphere in the tank or an excessively high underpressure relative to atmosphere in the tank, a connection is established by the existing pressure differences. A too rapid outflow of fuel vapor from the tank and to the activated carbon filter is additionally prevented by the flow control element according to the present invention, which limits the flow for all pressures to a maximum flow corresponding to a fuel vapor flow to be absorbed or stored by the activated carbon filter, respectively.

An example of an embodiment of a fuel vapor switching and venting valve for an internal combustion engine according to the present invention, in particular for use in a hybrid drive device, is shown in the drawings and is described below.

As shown in FIG. 1, the fuel vapor switching and venting valve 10 according to the present invention comprises a first connection 12 which projects laterally from a housing 14 of the fuel vapor switching and venting valve 10 and a second connection 16 which projects axially. The first connection 12 is connected to a fuel tank 18, while the second connection 16 is connected to an activated carbon filter 20. From the activated carbon filter 20, a conduit leads via a fuel vapor outlet valve 22 to atmosphere or via a second conduit in which a purge valve 24 is arranged to an internal combustion engine 26 where the fuel vapors can be fed to combustion.

Figure 2:
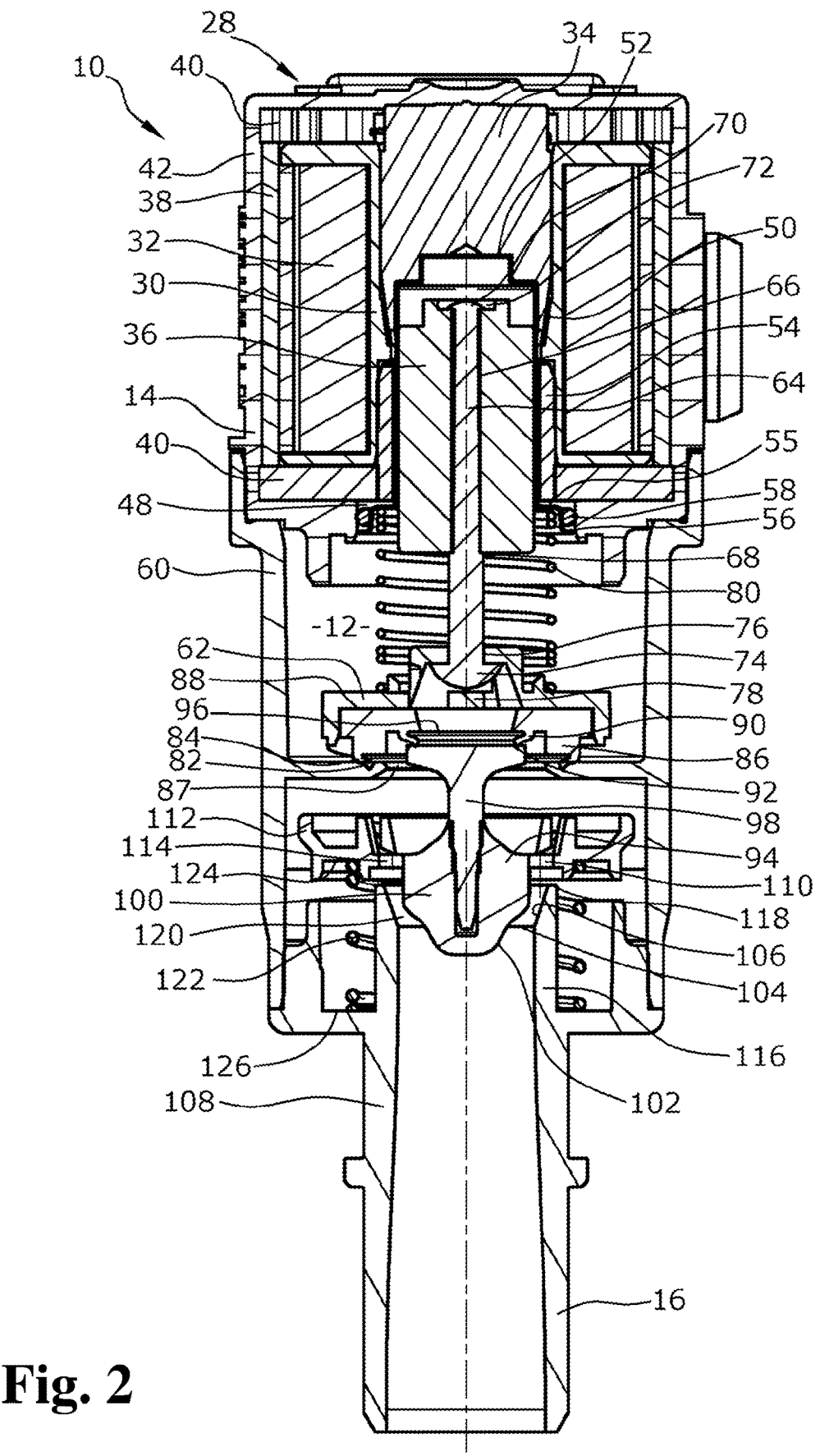
FIG. 2 shows a side view of the fuel vapor switching and venting valve according to the present invention from FIG. 1 in a sectional view.

The construction of the fuel vapor switching and venting valve 10 is shown in FIG. 2. The fuel vapor switching and venting valve 10 consists of an electromagnet 28 which serves as an actuator and comprises a coil 32 wound on a coil carrier 30, an internal core 34, an axially displaceable armature 36 as well as a yoke 38 radially surrounding the coil 32 and a back-iron plate 40 respectively arranged at the axial ends of the coil carrier 30, which define an electromagnetic circuit. This electromagnet 28, and in particular the yoke 38, is overmoulded with a plastic material to form an actuator housing part 42 of the housing 14, which also comprises a plug 44 and fastening eyes 46 and, at the end opposite to the core 34, comprises an axial opening 48 into which a sliding bush 50 is inserted, which guides the armature 36. This sliding bush 50 is made of a non-magnetizable material and is configured in the shape of a pot, wherein the bottom 52 rests against the core 34. The main guiding area of the sliding bushing 50 is surrounded by a soft magnetic bushing 54 which is pressed into the back-iron plate 40 and the coil carrier 30. The sliding bushing 50 comprises a radial extension 55 from which extends, at its open end, an extended region 56 arranged opposite the wall surfaces of the actuator housing part 42 defining the opening 48, wherein a sealing ring 58 is arranged between the extended region 56 of the sliding bushing 50 and the wall surface defining the opening 48, via which a penetration of fuel vapor in the direction of the coil 32 is prevented. A first flow housing part 60 is configured on the actuator housing part 42, which forms the first connection 12 and in which a valve body 62 is movable, which is coupled to the armature 36 by attaching a valve rod 64 to the armature 36, to which the valve body 62 is gimballed. The valve rod 64 is attached to the armature 36 by pushing the valve rod 64 through a through hole 66 in the armature 36 until the valve rod 64 with an extension 68 rests axially against the end of the armature 36 facing the valve body 62. In this state, the valve rod 64 protrudes from the armature 36 at the opposite end, where it can be deformed so that a type of rivet head 70 lies in a circular recess 72 against the side of the armature 36 facing the core 34. On the opposite side, the valve rod 64 also comprises a type of rivet head 74 which projects into the valve body 62 so that the valve body 62 rests against the flat end of the rivet head 74 on the armature side, for which purpose an opening 76 is configured on the valve body 62, the diameter of which corresponds substantially to the diameter of the valve rod 64. The round side of the rivet head 74 is arranged opposite a projection 78 which projects radially into the interior of the valve body 62 so that the valve body 62 is only slightly movable axially relative to the valve rod 64.

A spring element 80 biases the valve body 62 against the flat side of the rivet head 74 and biases the valve body 62 with the armature 36 against a first valve seat 82 configured on the first flow housing part 60 by clamping the spring element 80 between the valve body 62 and the extension 55 of the sliding bush 50.

In the closed state, the valve body 62 rests with a radially outer first contact surface 84, which is configured as a sealing lip of a sealing element 86, against the first valve seat 82, which surrounds a flow opening 87. The sealing element 86 consists of an elastic material, in particular an elastomer, and is attached to a carrier element 88, via which there is also a connection to the valve rod 64, so that the projection 78 and the opening 76 are configured on the carrier element 88. The carrier element 88 covers the sealing element 86 as far as possible in the direction of the armature 36 and also surrounds it at least partially radially. In addition to the first contact surface 84, the sealing element 86 also comprises a further second contact surface 90 placed radially within the first contact surface 84, which is also configured as a sealing lip and is arranged axially closer to the armature 36 than the first contact surface 84 and with which the sealing element 86 can be lowered onto a second valve seat 92.

This second valve seat 92 is axially movable and, according to the present invention, is configured on a flow limiting element 94 which, when resting on the second contact surface 90, closes a passage opening 96 formed radially within the second contact surface 90 on the sealing element 86 and on the valve body 62.

The flow limiting element 94 is configured in two parts and comprises a valve seat part 98, on which the second valve seat 92 is configured, and a control body 100, into which a pin-shaped part of the valve seat part 98 extends for attaching the control body 100 to the valve seat part 98. The control body 100 comprises a spherically shaped flow around surface 102 corresponding to a nozzle 104 configured on an inner surface 106 of a second flow housing part 108, which is attached to the first flow housing part 60 and which defines the second connection 16.

The flow limiting element 94 comprises webs 110 extending radially outwardly from the control body 100 and connecting the flow around surface 102 with a radially outer ring 112. A plurality of passage openings 114 are accordingly defined between the webs 110 and between the flow around surface 102 and the ring 112.

The second flow housing part 108 comprises a radially inner annular projection 116, on the inner side of which the nozzle 104 is configured and the axial end of which serves as a stop 118 for the movement of the flow limiting element 94 which, when the ring 112 abuts the stop 118, only clears a narrow gap 120 between the flow around surface 102 and the nozzle 104. The flow limiting element 94 is loaded towards the valve body 62 and away from the stop 118 via a spring 122, which is clamped between an axial groove 124 of the ring 112 and a contact surface 126 on the second flow housing part 108, so that the spring 122 presses the second valve seat 92 against the valve body 62 and biases the control body 100 out of the smallest cross-section of the nozzle 104.

The valve functions so that in the normal state the valve body 62 rests on the first valve seat 82 and the second valve seat 92 so that no flow exists between the connections 12, 16.

If, for example, due to heating, the pressure in the fuel tank 18 and thus at the first connection 12 rises to, for example, more than 0.3 bar above atmospheric pressure, the second valve seat 92 is lifted off the second contact surface 90 of the valve body 62, since at this pressure the forces acting on the flow limiting element 94 due to the pressure difference are greater than the spring force of the spring 122. Fuel vapor accordingly flows from the first connection 12 via the passage opening 96 on the valve body 62 and the flow opening 87 inside the first valve seat 82 and through the passage openings 114 between the webs 110 and the gap 120 to the second connection 16 and thus in the direction of the activated carbon filter 20, so that the pressure in the fuel tank 18 is reduced. At very high pressures, which would result in volumetric throughflows that can no longer be absorbed by the activated carbon filter 20, the function of the flow limiting element 94 comes into effect. The flow limiting element 94 is shifted up to the stop 118 at very high pressure differences. In this position, only the gap 120 is open between the control body 100 and the nozzle 104, which allows a maximum flow corresponding to the maximum permissible flow of the activated carbon filter 20 of, for example, about 220 l/min. In the other states, the flow through the gap 120 is changed depending on the applied pressure difference, i.e., a larger flow cross-section is made available with decreasing pressure.

If, for example, the pressure in the fuel tank 18 and thus at the first connection 12 drops to, for example, below −0.1 bar negative pressure compared to the atmosphere due to the tank being emptied, the valve body 62 is lifted off the first valve seat 82, since at this pressure the forces acting on the valve body 62 due to the pressure difference are greater than the spring force of the spring element 80. Air accordingly flows from the second connection 16 through the gap 120 between the control body 100 and the nozzle 104 and through the flow opening 87 and radially between the valve body 62 and the first valve seat 82 to the first connection 12, so that pressure equalization takes place in the tank. In this state, the flow limiting element 94 continues to rest against the second contact surface 90 of the valve body 62, thus being moved with it in the direction of the electromagnet 28 by the spring 122.

By energizing the electromagnet 28, it is furthermore possible to actively actuate the fuel vapor switching and venting valve 10. This is done, for example, before initiating the refueling process to provide that there is no overpressure or underpressure in the tank 18 at that time. In this case, lifting produces the same condition of the fuel vapor switching and venting valve 10 as in the case of a high negative pressure in the fuel tank 18. A flow of air from the second connection 16 to the first connection 12 is just as possible as a flow of fuel vapor in the opposite direction, wherein in this case the function of the flow limiting element 94 is maintained.

A fuel vapor switching and venting valve 10 is accordingly provided which can reliably relieve both negative and positive pressures in the fuel tank 18 and additionally limit the flow of fuel vapor to a maximum permissible value. Active switching is also possible. All these functions are realized in a small-sized valve with a minimum number of parts.

It should be obvious that various modifications are possible compared to the embodiment example without leaving the scope of protection of the present invention. In addition to a different configuration of the housing separations, the flow limiting element 94, the electromagnet 28 or the valve body 62 can also be configured differently. The switching points can be individually adjusted with the available springs depending on the application. The same applies to the maximum permissible flow rate, which can be adjusted by constructively modifying the nozzle 104 and/or the flow limiting element 94. Reference should also be had to the appended claims.

LIST OF REFERENCE NUMERALS

10 Fuel vapor switching and venting valve
12 First connection
14 Housing
16 Second connection
18 Fuel tank
20 Activated carbon filter
22 Fuel vapor outlet valve
24 Purge valve
26 Internal combustion engine
28 Electromagnet
30 Coil carrier
32 Coil
34 Core
36 Armature
38 Yoke
40 Back-iron plate
42 Actuator housing part
44 Plug
46 Fastening eyes
48 Opening
50 Sliding bush
52 Bottom
54 Soft magnetic bushing
55 Radial extension
56 Extended region
58 Sealing ring
60 First flow housing part
62 Valve body
64 Valve rod
66 Hole
68 Extension (of valve rod)
70 Rivet head
72 Circular recess
74 Rivet head
76 Opening
78 Projection
80 Spring element
82 First valve seat
84 First contact surface
86 Sealing element
87 Flow opening
88 Carrier element
90 Second contact surface
92 Second valve seat
94 Flow limiting element
96 Passage opening
98 Valve seat part
100 Control body
102 Flow around surface
104 Nozzle
106 Inner surface
108 Second flow housing part
110 Webs
112 Ring
114 Passage openings
116 Annular projection
118 Stop
120 Gap
122 Spring
124 Axial groove
126 Contact surface

What is claimed is:

1. A fuel vapor switching and venting valve for an internal combustion engine, the fuel vapor switching and venting valve comprising:
   an electromagnet comprising an armature;
   a first connection;
   a second connection;
   a first valve seat which is arranged between the first connection and the second connection;
   a spring;
   a flow limiting element;

a second valve seat which is arranged on the flow limiting element; and a valve body coupled to the armature of the electromagnet, the valve body comprising a first contact surface with which the valve body can be lowered onto and lifted off of the first valve seat, and a second contact surface with which the valve body can be moved against the second valve seat, wherein, the second valve seat is configured to be axially displaceable, and the spring is configured to load the second valve seat in a direction of the valve body.

2. The fuel vapor switching and venting valve as recited in claim 1, wherein, the second connection comprises a flow housing part with a nozzle arranged therein, the flow limiting element comprises a control body which is movable into the nozzle, and the spring is further configured to load the flow limiting element in a direction facing out of the nozzle.

3. The fuel vapor switching and venting valve as recited in claim 2, wherein, the nozzle comprises an inner surface, and the flow limiting element further comprises a flow around surface which is spherically shaped or conically shaped, the flow around surface being arranged opposite to the inner surface of the nozzle.

4. The fuel vapor switching and venting valve as recited in claim 3, further comprising:

a radially outer ring which is arranged on the flow limiting element; and at least one passage opening which is arranged radially between at least one of the radially outer ring and the second valve seat and the radially outer ring and the flow around surface, wherein, the spring is further configured to abut against the radially outer ring.

5. The fuel vapor switching and venting valve as recited in claim 4, wherein, the flow housing part of the second connection comprises a stop arranged thereon, and the flow limiting element is configured to abut against the stop in a state which minimizes a gap between the flow around surface of the flow limiting element and the inner surface of the nozzle.

6. The fuel vapor switching and venting valve as recited in claim 4, wherein, the radially outer ring comprises an axial groove arranged thereon, and an end of the spring which abuts against the radially outer ring projects into the axial groove.

7. The fuel vapor switching and venting valve as recited in claim 4, wherein the spring is clamped between the radially outer ring and a contact surface of the flow housing part of the second connection.

8. The fuel vapor switching and venting valve as recited in claim 1, wherein the valve body further comprises a passage opening arranged therein, the passage opening being configured to open radially within the second valve seat.

9. The fuel vapor switching and venting valve as recited in claim 1, further comprising:

a valve rod which is attached to the armature, wherein, the valve body is gimballed to the valve rod.

10. The fuel vapor switching and venting valve as recited in claim 9, wherein the valve body further comprises a carrier element which is attached to the valve rod and which is made of a solid material, and a sealing element with which the valve body can be lowered onto the first valve seat and the second valve seat and which is made of an elastic material.

11. The fuel vapor switching and venting valve as recited in claim 9, further comprising:

a spring element, wherein, the electromagnet further comprises a core, and the spring element is clamped between the armature and the core of the electromagnet.

12. The fuel vapor switching and venting valve as recited in claim 9, further comprising a spring element which is clamped between the electromagnet and the valve body and which surrounds the valve rod.

13. The fuel vapor switching and venting valve as recited in claim 12, wherein, the electromagnet comprises a sliding bush which comprises a radial extension, the spring element rests against the radial extension of the sliding bush, and the sliding bush is configured to guide the armature therein and to seal the electromagnet with respect to the first connection and the second connection.

14. The fuel vapor switching and venting valve as recited in claim 1, wherein the armature of the electromagnet, the valve body and the flow limiting element are arranged axially one behind the other and are displaceable along a common axis.

* * * * *